(12) United States Patent
De Guglielmo et al.

(10) Patent No.: US 12,485,557 B2
(45) Date of Patent: Dec. 2, 2025

(54) ELASTIC BALANCING OF LOADS IN AN EXOSKELETON

(71) Applicants: FONDAZIONE ISTITUTO ITALIANO DI TECNOLOGIA, Genoa (IT); I.N.A.I.L. ISTITUTO NAZIONALE PER L'ASSICURAZIONE CONTRO GLI INFORTUNI SUL LAVORO, Rome (IT)

(72) Inventors: Luca De Guglielmo, Genoa (IT); Gianluca Capitta, Genoa (IT); Matteo Laffranchi, Genoa (IT); Lorenzo De Michieli, Genoa (IT)

(73) Assignees: FONDAZIONE ISTITUTO ITALIANO DI TECNOLOGIA, Genoa (IT); I.N.A.I.L. ISTITUTO NAZIONALE PER L'ASSICURAZIONE CONTRO GLI INFORTUNISUL LAVORO, Rome (IT)

(*) Notice: Subject to any disclaimer, the term of this patent is extended or adjusted under 35 U.S.C. 154(b) by 254 days.

(21) Appl. No.: 18/501,878

(22) PCT Filed: May 3, 2022

(86) PCT No.: PCT/IB2022/054070
§ 371 (c)(1),
(2) Date: Nov. 3, 2023

(87) PCT Pub. No.: WO2022/234446
PCT Pub. Date: Nov. 10, 2022

(65) Prior Publication Data
US 2024/0316798 A1 Sep. 26, 2024

(30) Foreign Application Priority Data
May 4, 2021 (IT) .......................... 102021000011273

(51) Int. Cl.
*B25J 19/00* (2006.01)
*B25J 9/00* (2006.01)
*B25J 9/10* (2006.01)

(52) U.S. Cl.
CPC .......... *B25J 19/0016* (2013.01); *B25J 9/0006* (2013.01); *B25J 9/104* (2013.01)

(58) Field of Classification Search
CPC .......................... B25J 19/0016; B25J 19/0008
See application file for complete search history.

(56) References Cited

U.S. PATENT DOCUMENTS 3,391,804 A * 7/1968 Flatau ...................... B25J 9/046
901/48
4,753,128 A * 6/1988 Bartlett ................ B25J 19/0016
16/401
(Continued)

FOREIGN PATENT DOCUMENTS

CN 103536426 B 7/2014
CN 107738275 A 2/2018
(Continued)

OTHER PUBLICATIONS

EPO Machine Translation of the Description of WO 2018/203318 A1, Kobayashi et al., Nov. 8, 2018. (Year: 2025).*
(Continued)

*Primary Examiner* — Daniel D Yabut
(74) *Attorney, Agent, or Firm* — Valauskas Corder LLC

(57) ABSTRACT

An exoskeleton having a mechanism for elastically balancing loads applied to the exoskeleton is provided. The mechanism has a rigid connection element and a rigid housing mutually pivoted to one another about a first axis of oscillation and attachable to respective relatively rotatable parts of the exoskeleton. A lever is rotatably mounted to the rigid housing about a second axis of oscillation. A flexible traction element has a first end rotationally secured to the rigid
(Continued)

connection element with respect to the first axis of oscillation and a second end secured to the lever at a securing point spaced from the second axis of oscillation. A compression spring exerts a thrust, away from the first axis of oscillation, against a portion of the lever intermediately between the second axis of oscillation and the securing point to the second end of the flexible traction element.

10 Claims, 5 Drawing Sheets

(56) References Cited

U.S. PATENT DOCUMENTS

| | | | |
|---|---|---|---|
| 4,768,762 A | 9/1988 | Lund | |
| 5,472,412 A | 12/1995 | Knoth | |
| 9,889,554 B2 * | 2/2018 | Van Engelhoven | B25H 1/10 |
| 2015/0190246 A1 * | 7/2015 | Ryu | A61H 1/0285 |
| | | | 74/89.22 |
| 2016/0339583 A1 * | 11/2016 | Van Engelhoven | B25J 9/0006 |
| 2016/0368151 A1 * | 12/2016 | Han | B25J 19/0016 |
| 2018/0111262 A1 * | 4/2018 | Van Engelhoven | B25J 9/0006 |
| 2019/0321965 A1 | 10/2019 | Van Engelhoven et al. | |

FOREIGN PATENT DOCUMENTS

| | | | |
|---|---|---|---|
| GB | 329286 A | 5/1930 | |
| WO | 2018165261 A1 | 9/2018 | |
| WO | WO-2018203318 A1 * | 11/2018 | B25J 11/00 |
| WO | 2020245038 A1 | 12/2020 | |

OTHER PUBLICATIONS

International Search Report & Written Opinion issued in PCT/IB2022/054070, mailed Sep. 13, 2022, Rijswijk, NL.

* cited by examiner

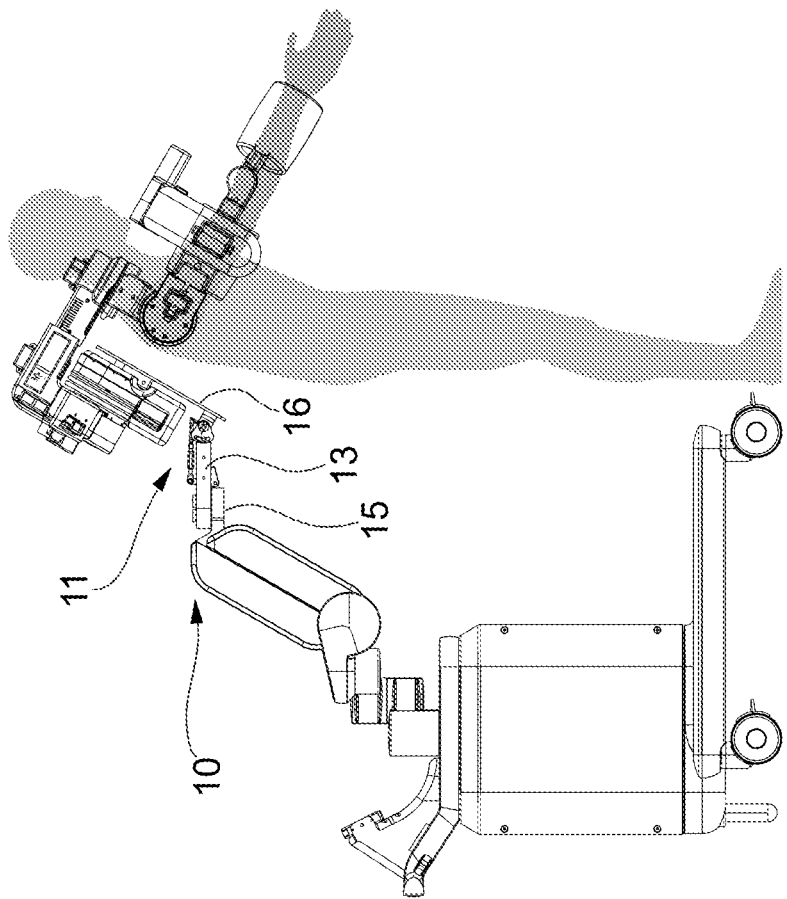
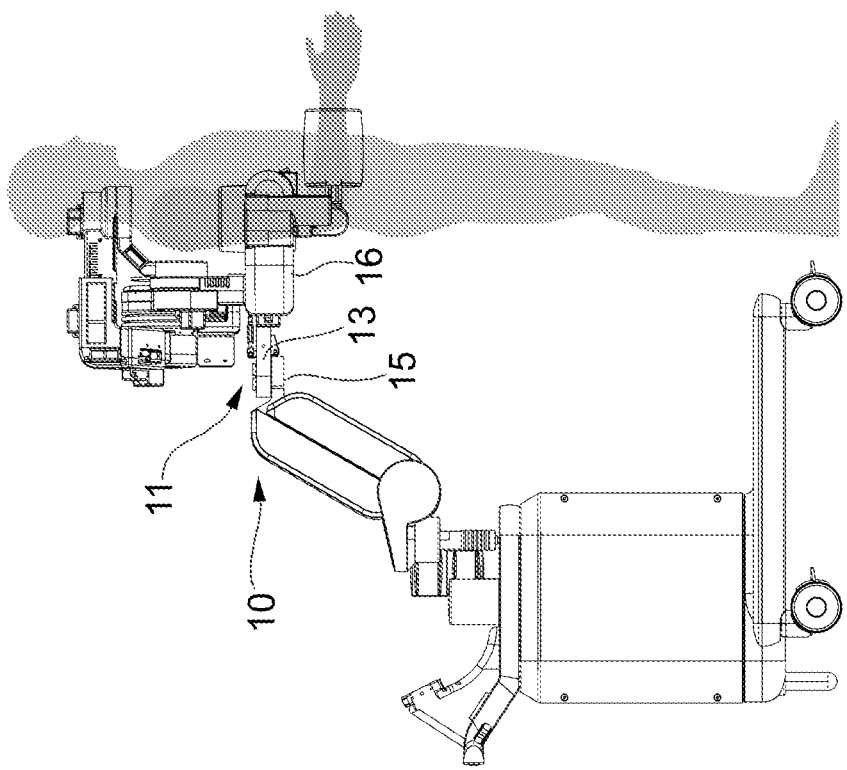

ELASTIC BALANCING OF LOADS IN AN EXOSKELETON

CROSS-REFERENCE TO RELATED APPLICATIONS

This application is a U.S. National Phase filing of PCT International Patent Application No. PCT/IB2022/054070, having an international filing date of May 3, 2022, which claims priority to Italian Patent Application No. 102021000011273, filed May 4, 2021 each of which is hereby incorporated by reference in its entirety.

TECHNICAL FIELD

The present invention relates to an exoskeleton with a mechanism for elastically balancing loads applied to the exoskeleton.

BACKGROUND ART

As known, exoskeletons are applied to aid a person in movement, such as in the rehabilitation of a patient, or in the manufacturing industry, to help operators lift or move heavy loads, or to hold arms raised for long periods of time.

Elastic load-balancing mechanisms, in which the movement of an element that is rotated is counterbalanced by the elastic force of a spring under tension, are known in the art. See, for example, patent publications CN 107738275 A, GB 329286 A, U.S. Pat. No. 4,768,762 A.

With exoskeletons, the need is felt to leave plenty freedom of movement to the wearer, not only relative to the limb involved in rehabilitation or the execution of certain movements, but to the whole body.

SUMMARY OF THE INVENTION

Thus, the present invention aims to provide an exoskeleton of the type specified above, primarily addressing the problem of constructing an elastic mechanism, incorporated in the exoskeleton, having as compact of dimensions as possible, while still being able to be loaded elastically and to return an adequate elastic force to the user. An additional object of the invention is to obtain a robust and mechanically simple balancing mechanism.

The above and other objects and advantages are fully achieved according to the present invention by an exoskeleton as described and claimed herein. Preferred embodiments are are also described.

In summary, the invention is based on the idea of equipping an exoskeleton with a compensating mechanism that, due to the presence of a lever, allows the use of a very stiff compression spring able to return a particularly high intensity force while occupying a small footprint.

According to one aspect, the invention provides an exoskeleton comprising a mechanism for elastically balancing loads applied to the exoskeleton, where the mechanism comprises:
  a connection element and a housing pivoted about a first axis of oscillation and attachable to two respective relatively rotatable parts of the exoskeleton;
  at least one lever rotatably mounted to the housing about a second axis of oscillation parallel to the first;
  at least one flexible traction element having a first end integral with the connection element and a second end secured to the lever at a securing point spaced from the second axis of oscillation;
  at least one compression spring acting in a push ratio against the lever moving away from the first axis of oscillation.

BRIEF DESCRIPTION OF THE DRAWINGS

Further features and advantages of this invention will become clear from the detailed description that follows, given purely by way of non-limiting example with reference to the accompanying drawings, in which:

FIGS. 1 and 2 are schematic views of an exemplifying exoskeleton, equipped with a mechanism for elastically balancing loads according to an embodiment of the invention, in two operating positions;

DETAILED DESCRIPTION

Figure 3:
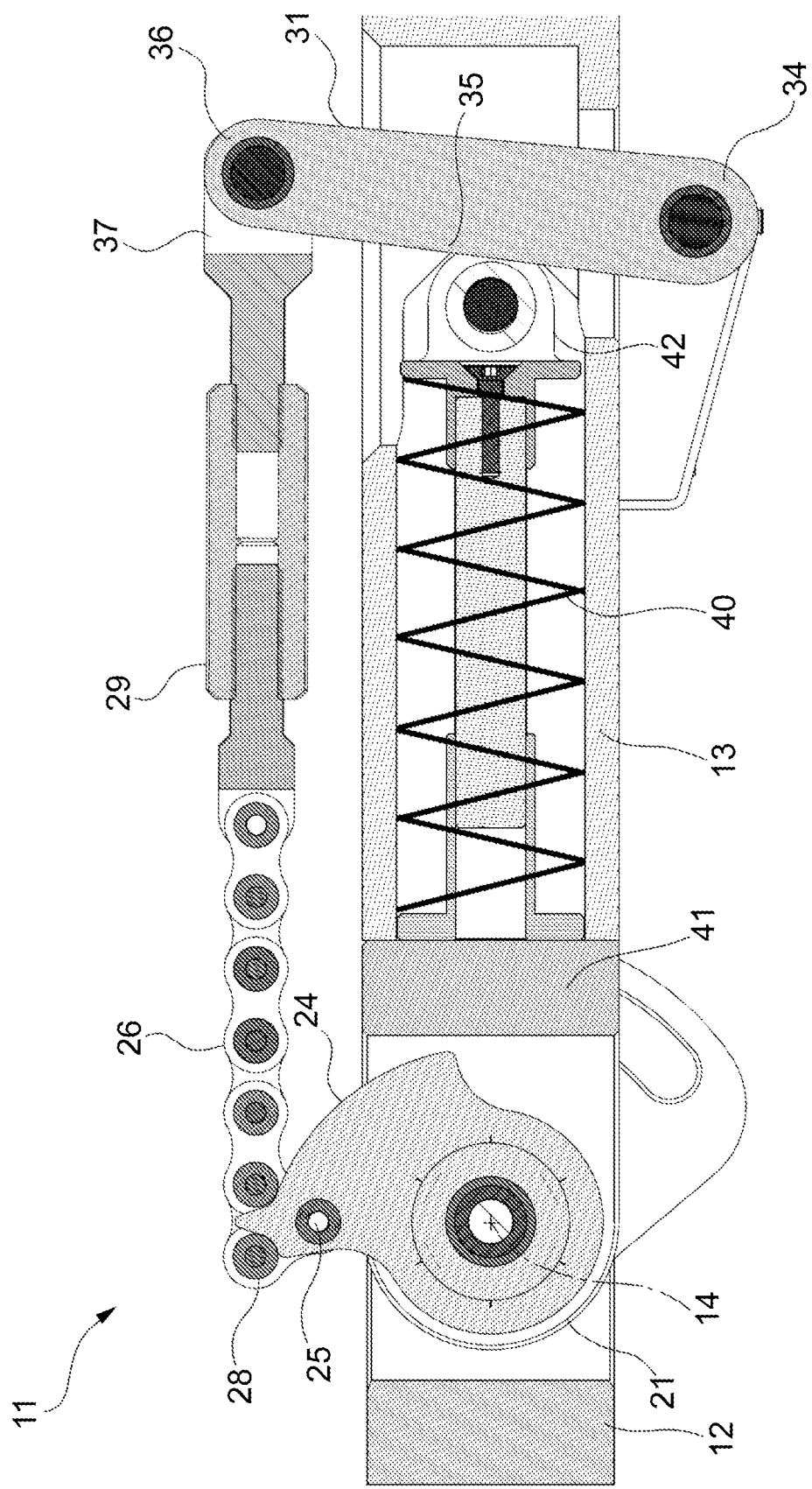
FIGS. 3 and 4 are schematic views in longitudinal section of an elastic balancing mechanism in two distinct operating positions.

Referring initially to FIGS. 1 and 2, the number 10 designates an exoskeleton, applied in this example to a user's shoulder to move integrally therewith. Reference to this possible field of application should in no way be interpreted as limiting. Those skilled in the art will recognize that the principle of operation of the balancing mechanism disclosed herein is applicable both to rehabilitative exoskeletons other than the one in FIGS. 1 and 2 and applicable to other parts of the human body, and to exoskeletons that may be used in fields other than biomedical engineering, such as in the manufacturing industry.

The exoskeleton 10 comprises a mechanism 11 for elastically balancing loads applied to the exoskeleton. The mechanism 11 comprises a connection element 12 and a housing 13 mutually pivoted about a first axis of oscillation 14, in this example a horizontally oriented axis. The connection element 12 and the housing 13 are two rigid elements that may be attached to two additional elements of the exoskeleton, respectively. In the present example, the housing 13 is attached to a proximal part 15 of the exoskeleton, while the connection element 12 is attached to a distal element 16 of the exoskeleton, which follows the movements of the user's body, in this example, the movements of the user's shoulder.

Figure 5:
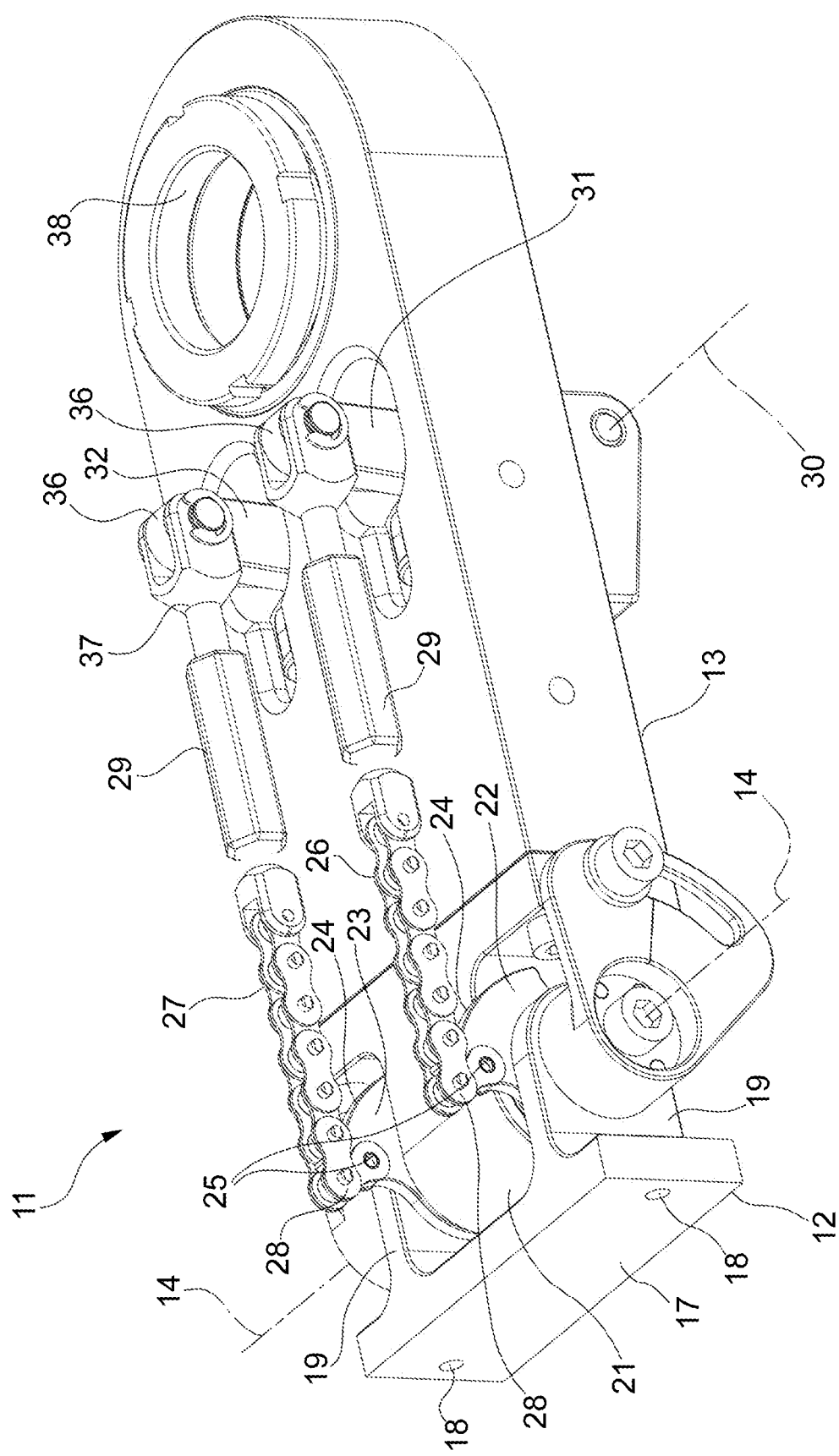
FIG. 5 is a schematic perspective view of the mechanism in FIGS. 3 and 4.
Figure 6:
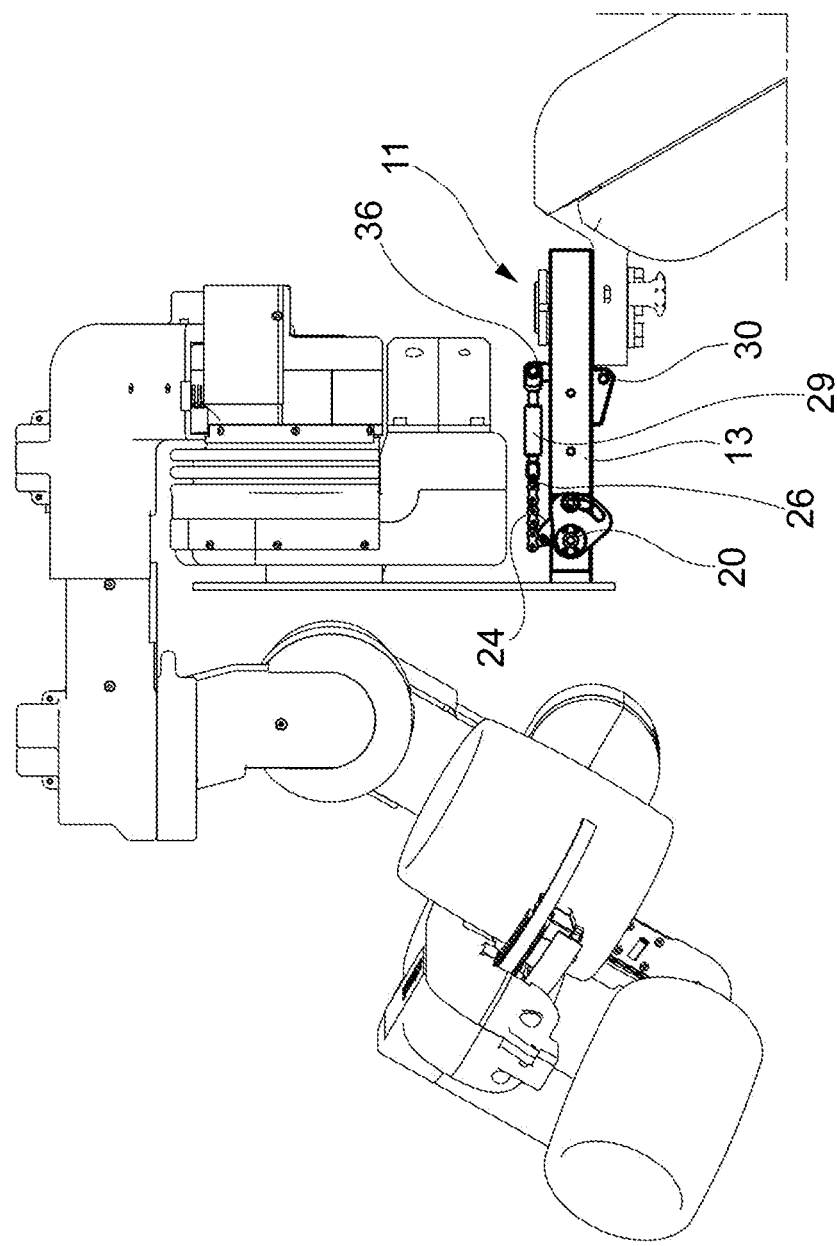
FIG. 6 is an elevation view of the exoskeleton and its balancing mechanism.

In the embodiment shown in the drawings, the connection element 12 comprises a plate portion 17 with holes 18 for attaching to the movable element 16 of the exoskeleton, and two lugs 19 supporting an axis 20 arranged along the first axis of oscillation 14. One end 21 of the housing 13 is hinged to the axis 20. For attachment to the exoskeleton, the housing 13 has attachment means 38, in this example in the form of a bushing (FIG. 5).

According to an embodiment, an eccentric element or cam 22 is rotationally integral to the connection element 12 around the first axis of oscillation 14. Preferably, as in the example shown, there are two eccentric elements (or cams) 22, 23 spaced along the axis of oscillation 14. Each eccentric element 22, 23 has a radially outer eccentric surface 24 and a securing point 25 where a first end 28 of a respective flexible and elastically inextensible traction element 26, 27 is attached to be rotationally integral with the connection element 12 about the first axis of oscillation.

At least one lever 31, preferably two parallel levers 31, 32, is rotatably mounted on the housing 13 about a second axis of oscillation 30 parallel to the first axis of oscillation 14. The levers 31, 32 are hinged to the housing at their first ends 34 at the second axis of oscillation, and each has a second end 36 secured to a respective second end 37 of the two traction elements 26, 27.

The traction elements 26, 27 may comprise chains or cables or other flexible and inextensible bodies.

Preferably, as in the illustrated embodiment, each traction element 26, 27 incorporates a respective adjusting device 29, in this example, a threaded adjusting device, for adjusting the length of the respective traction element.

The housing comprises at least one elastic element in the form of a compression spring 40, elastically compressed between a base 41 integral with the housing and arranged on the side of the first axis of oscillation 14, and a head 42 movable along the housing arranged farthest from the first axis of oscillation 14 and nearest to the second axis of oscillation 30, and acting in a thrust relationship against an intermediate portion 35 of the lever or of each lever 31, 32, at an intermediate position between the second axis of oscillation 30 and the second end 36 of the levers 31, 32.

The head 42 may appropriately rest on the lever 31, 32 and act against it in a thrust relationship without being articulately connected thereto.

Two or more parallel and cooperating compression springs 40 may be provided, acting in a thrust relationship against the levers 31, 32. The elastic force of compression springs 40 tensions the traction elements 26, 27. The adjusting devices 29 allow the preload of the compression spring or springs 40 to be adjusted.

Figure 4:
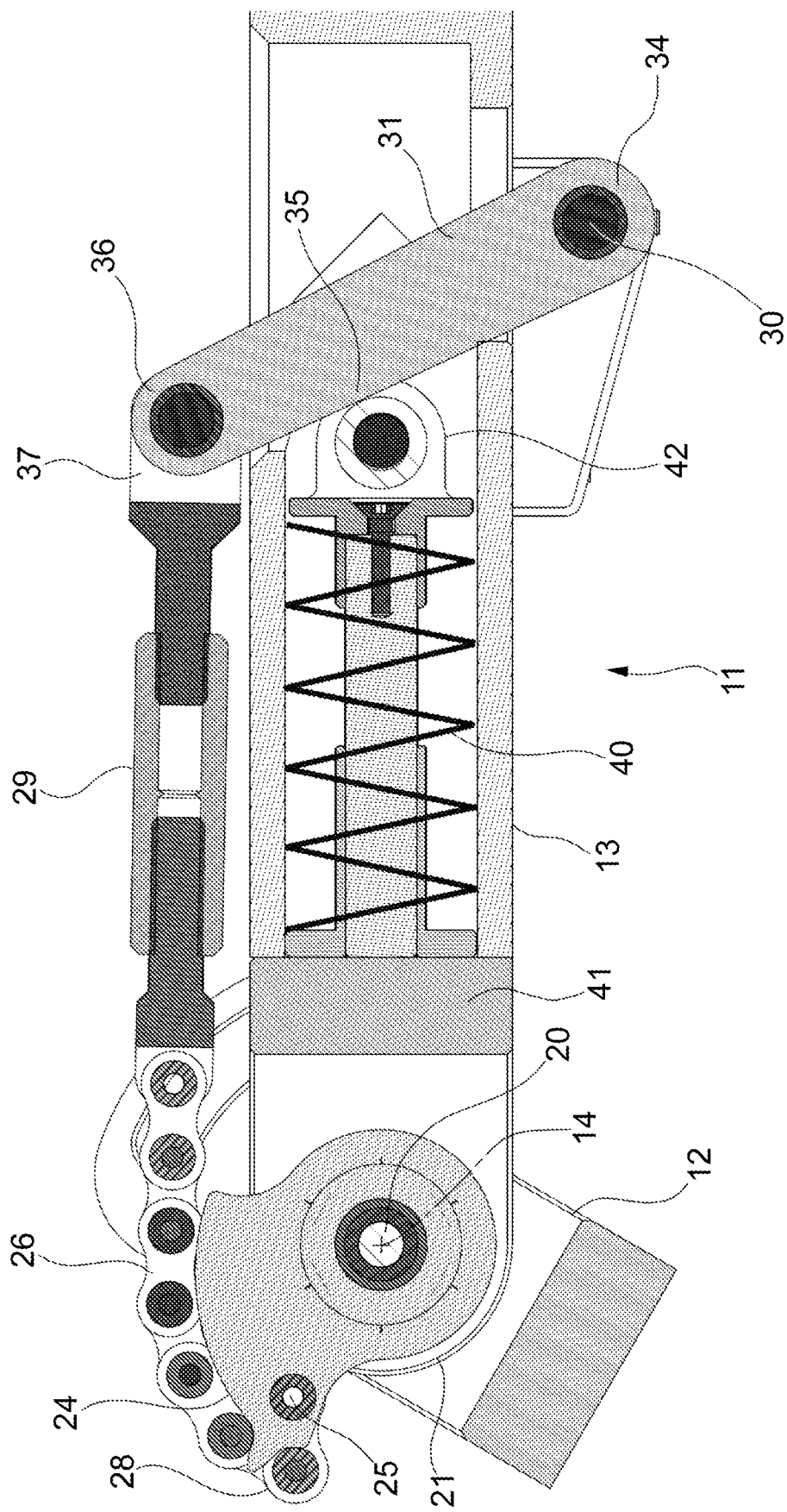

Preferably, as shown in FIGS. 3 and 4 the compression spring 40 is accommodated within the housing 13 and is guided within it in its compression and extension movements.

Preferably, as illustrated in the example of FIG. 5, the mechanism 11 comprises two or more levers 31, 32 and a corresponding number of said traction elements 26, 27, each associated with a respective lever and lying in parallel planes, perpendicular to the axes of oscillation 14, 30.

The operation of the mechanism 11 is as follows. Starting from an initial or rest position (FIGS. 1 and 3), the compression spring 40 is distended or at most subjected to a preload determined by the calibration of the adjusting device 29. When a movement imparted by the user to the exoskeleton causes a rotation of the distal part 16 of the exoskeleton (FIG. 2), the resulting relative rotation between the connection element 12 and the housing 13 about the first axis of oscillation 14 also puts the cam 22 into rotation, which, by means of the traction elements 26, 27, pulls the lever 31, 32 toward the first axis of oscillation, further compressing the spring 40. The reaction of the spring generates about the first axis of oscillation an equal and opposite torque to that produced by the load. The torque generated varies with the angle of rotation of the load due to the different compression of the spring and the particular profile of the radially outer surface 24 of the cams 22, 23.

As may be appreciated, the mechanism 11 has a very compact configuration due to the presence of a lever combined with a compression spring. With respect to a conventional direct connection between the spring and the flexible element, characteristic of current state-of-the-art systems, the introduction of levers 31, 32 enables:

- a simple placement of compression springs arranged parallel to and very close to the flexible traction elements 26, 27, with obvious advantages to the transverse footprint;
- the introduction of a lever ratio that allows the use of stiffer springs with less travel.

The compression springs may be very short; since they are not subject to elongation (but rather to shortening, being compression springs), there is no need to provide dedicated spaces in the exoskeleton to allow for their temporary elongation during the operation phase; this results in a further reduction in bulk. The spring, in fact, is the element that most affects the overall size of a mechanism of this type; therefore, the possibility of using stiff springs with a reduced stroke ensures a remarkable compactness of the mechanism.

Preferably, the profile of the radially external surfaces 24 of the cam(s) 22, 23 is made so that the product of the distance from the first axis of oscillation 14 of the tangential force and said tangential force, generated by the action of the spring 40 on the lever 31, is increasing equivalently to the torque to be balanced. In fact, the torque to be balanced, which is equal to the weight of the moving part of the exoskeleton times the horizontal distance of its center of gravity from the axis of rotation, increases with the inclination of the moving part of the exoskeleton with respect to the vertical axis in a manner directly proportional to the sine of the angle of inclination.

According to a preferred embodiment, the radially outer and eccentric surfaces 24 are shaped so that they have a greater radial distance from the first axis of oscillation 14 in their part farthest from the levers 31, 32 and a smaller radial distance in their part closest to the levers 31, 32. The securing points 25 of the traction elements 26, 27 to the cams 22, 23 are located in the parts of the cams where the radial distance of the outer surfaces 24 from the first axis of oscillation 14 is greatest. The traction elements 26, 27, winding on the radially outer surfaces of the cams, act tangentially to the first axis of rotation of the cams, always ensuring the required torque as the spring compresses.

According to the prior art, a direct connection between the spring and the element that winds on the cam forces the use of a spring with useful travel at least equal to the entire perimeter of the cam. This results in a long spring, which increases the bulk. The free length of the spring strongly conditions the axial dimension of the system, which is the preponderant and most difficult one to limit. According to one aspect of the present invention, by instead exploiting the lever ratio at the same cam perimeter, the required travel of the spring is reduced; therefore, springs with higher stiffness and smaller travel, i.e., shorter, may be used.

An advantage related to the parallelism between the axis of the compression spring 40 and the traction element 26, 27 will also be appreciated: if, as in the present state of the art, the line of action of the spring and that of the element that winds on the cam may not be arranged parallel and close together, the dimension perpendicular to the axes of action of the flexible element is greatly affected. In contrast, the mechanism described here arranges all the elements on extremely close parallel straight lines, so that the transverse dimension of the device is little larger than the footprint of the individual elements.

The described system finds its application whenever it is necessary to balance a load free to rotate about a non-barycentric axis while minimizing the size of the mechanism.

Various aspects and embodiments of the exoskeleton have been described. It is understood that each embodiment may be combined with any other embodiment. Moreover, the invention is not limited to the embodiments described, but may be varied within the scope defined by the appended claims.

The invention claimed is:

1. An exoskeleton comprising a mechanism for elastically balancing loads applied to the exoskeleton, the mechanism comprising:
- a rigid connection element and a rigid housing mutually pivoted to one another about a first axis of oscillation and attachable to respective relatively rotatable parts of the exoskeleton;
- at least one lever rotatably mounted to the rigid housing about a second axis of oscillation parallel to the first axis of oscillation;
- at least one flexible traction element having a first end rotationally secured to the rigid connection element with respect to the first axis of oscillation and a second end secured to said at least one lever at a securing point spaced from the second axis of oscillation; and
- at least one compression spring elastically compressed between a base integral with the rigid housing and arranged on a side of the first axis of oscillation, and a head movable along the rigid housing and farther from the first axis of oscillation and closer to the second axis of oscillation, the head acting in a thrust relationship, away from the first axis of oscillation, against a portion of the at least one lever intermediately between the second axis of oscillation and the securing point to the second end of the at least one flexible traction element.

2. The exoskeleton of claim 1, wherein the mechanism further comprises at least one cam element rotationally integral with the rigid connection element with respect to the first axis of oscillation, said at least one cam element having a radially outer surface eccentric with respect to the first axis of oscillation and having a greater radial distance from the first axis of oscillation in one part farther away from said at least one lever, and a shorter radial distance from the first axis of oscillation in one part closer to said at least one lever.

3. The exoskeleton of claim 1, wherein said at least one compression spring extends in a direction substantially parallel to said at least one flexible traction element.

4. The exoskeleton of claim 1, wherein the mechanism comprises a plurality of levers and of flexible traction elements each associated with a respective one of said levers and lying in parallel planes, perpendicular to the first and second axes of oscillation.

5. The exoskeleton of claim 1, wherein the mechanism comprises a plurality of compression springs arranged side by side.

6. The exoskeleton of claim 1, wherein said at least one compression spring is received inside said rigid housing and guided inside the rigid housing in its compression and extension movements.

7. The exoskeleton of claim 1, further comprising at least one adjusting device adapted to adjust a preload of said at least one compression spring.

8. The exoskeleton of claim 7, wherein the at least one adjusting device includes a threaded adjusting device for adjusting a length of said at least one flexible traction element.

9. The exoskeleton of claim 1, wherein said head is stressed by said at least one compression spring and acts in a bearing relationship against said at least one lever.

10. The exoskeleton of claim 2, wherein the radially outer surface of said at least one cam element is shaped so that a product of a tangential force generated by an action of the at least one compression spring on the at least one lever and a distance of the tangential force from the first axis of oscillation, increases in a manner equivalent to a torque to be balanced.

* * * * *